(12) United States Patent
Calderón De Los Santos

(10) Patent No.: US 6,709,490 B1
(45) Date of Patent: Mar. 23, 2004

(54) COMBINED SYSTEM FOR REMOVING CONTAMINANTS FROM GAS EFFLUENTS

(76) Inventor: Juan José Calderón De Los Santos, Barranca del Muerto 512, Colonia Los Alpes (MX), 01010

( * ) Notice: Subject to any disclaimer, the term of this patent is extended or adjusted under 35 U.S.C. 154(b) by 0 days.

(21) Appl. No.: 10/019,662

(22) PCT Filed: Jun. 30, 2000

(86) PCT No.: PCT/MX00/00025
§ 371 (c)(1),
(2), (4) Date: Mar. 14, 2002

(87) PCT Pub. No.: WO01/02081
PCT Pub. Date: Jan. 11, 2001

(30) Foreign Application Priority Data

Jul. 2, 1999 (MX) ............................. 996261

(51) Int. Cl.[7] .......................... B03C 1/023; B03C 3/017
(52) U.S. Cl. .................. 96/3; 95/28; 95/69; 95/73; 96/57; 96/63; 96/74
(58) Field of Search .................. 96/1–3, 55, 57, 96/63, 74; 95/27, 28, 63, 67, 69, 70, 73, 78

(56) References Cited

U.S. PATENT DOCUMENTS

| 4,170,447 | A | | 10/1979 | Goldstein et al. | |
|---|---|---|---|---|---|
| 4,225,323 | A | | 9/1980 | Zarchy et al. | |
| 4,375,982 | A | * | 3/1983 | Chitil | 48/210 |
| 4,979,364 | A | | 12/1990 | Fleck | |
| 5,492,677 | A | * | 2/1996 | Yoshikawa | 422/174 |
| 5,759,239 | A | * | 6/1998 | Yu | 96/3 |
| 5,792,238 | A | * | 8/1998 | Johnson et al. | 95/60 |
| 5,968,231 | A | * | 10/1999 | Parmentier et al. | 95/28 |
| 6,149,713 | A | * | 11/2000 | Ochi et al. | 95/28 |
| 6,203,710 | B1 | * | 3/2001 | Woodbridge | 210/695 |
| 6,251,281 | B1 | * | 6/2001 | Ohkawa | 210/695 |

FOREIGN PATENT DOCUMENTS

| EP | 0 385 310 A | 9/1990 |
|---|---|---|
| JP | 08038934 A | 3/1996 |
| JP | 11 197543 A | 7/1999 |

* cited by examiner

*Primary Examiner*—Richard L. Chiesa
(74) *Attorney, Agent, or Firm*—Rothwell, Figg, Ernst & Manbeck

(57) ABSTRACT

It is disclosed a combined system for the elimination of pollutants from gaseous effluents of the type that comprises means for carrying out at least one electronic bombardment operation and means for carrying out at least one electrostatic interaction operation, in which a heat diffusion and molecular destabilization operation is performed as a previous treatment in order to restrict the flow of gases in such a way that it causes the gas molecules and suspended particles to tend to split up and electronically destabilize at the time that the temperature of the same gases is reduced; and/or a magnetic molecular rearrangement operation is carried out prior to each electrostatic interaction operation, consisting of subjecting the gases to a magnetic field having such a force that achieve a rearrangement of the subparticles and heavier molecules thus achieving a selective separation that prepares the gaseous stream for the electrostatic interaction operation. It is described also an apparatus with the system incorporated therein.

53 Claims, 8 Drawing Sheets

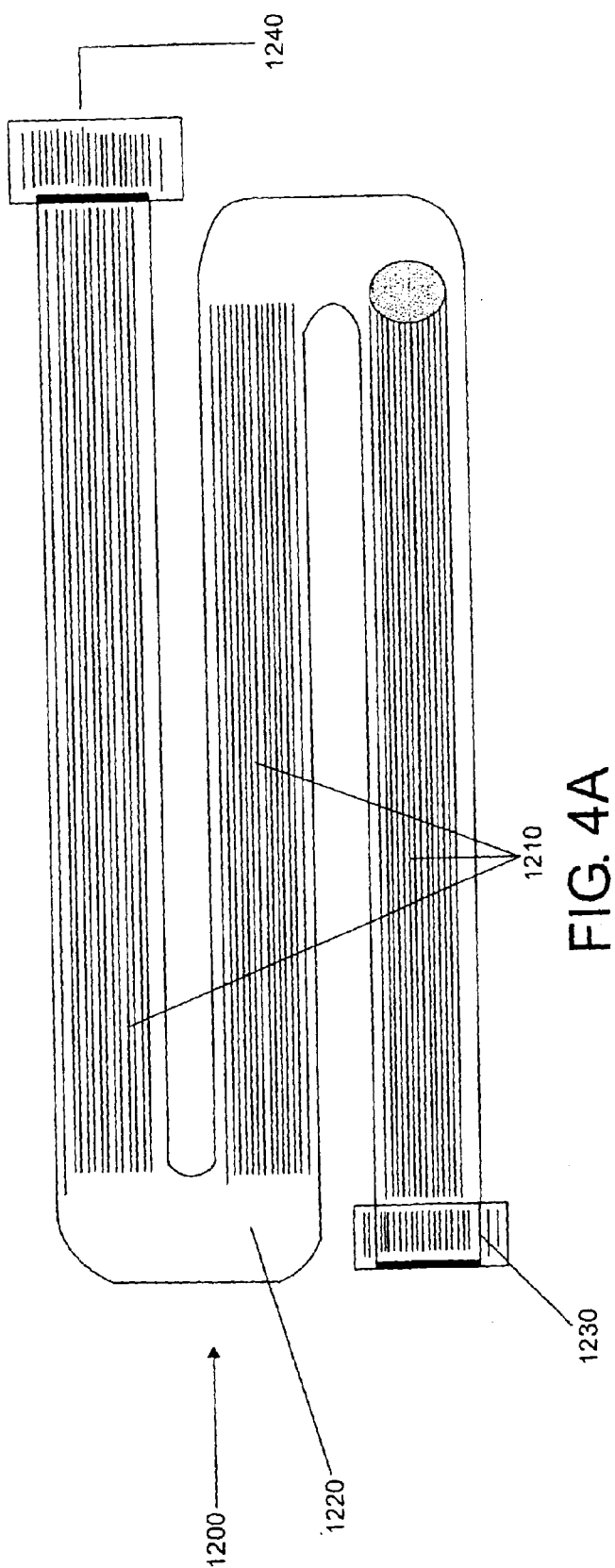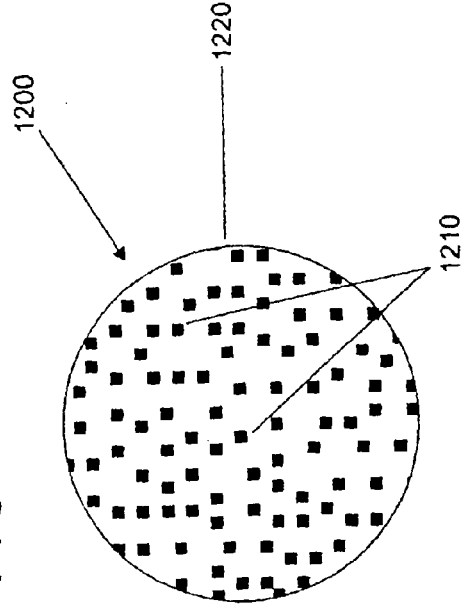

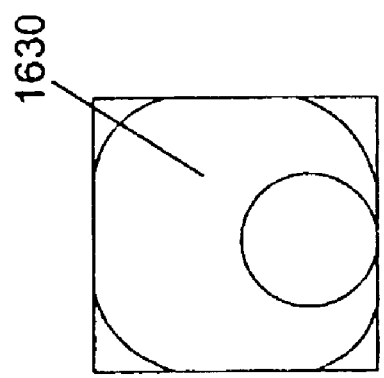
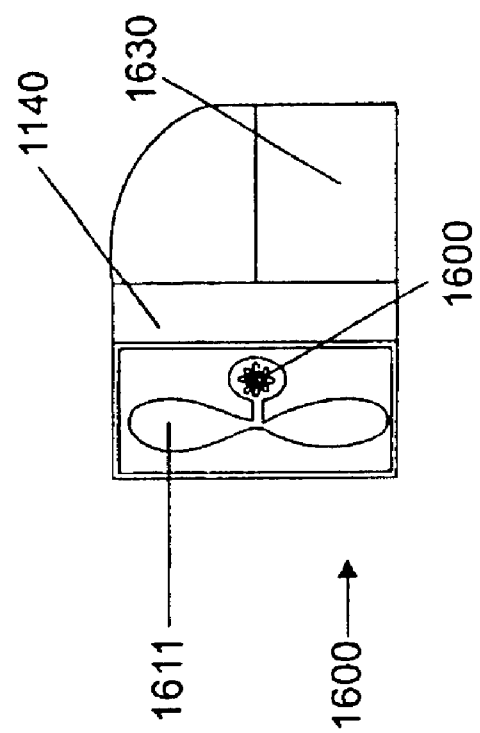
FIG. 8A
FIG. 8B

COMBINED SYSTEM FOR REMOVING CONTAMINANTS FROM GAS EFFLUENTS

FIELD OF THE INVENTION

The present invention is related to the techniques for the elimination of pollutants, and more particularly, it is related to a combined system for the elimination of pollutants from gaseous effluents.

BACKGROUND OF THE INVENTION

Pollution has existed since man began to modify his environment by using tools, managing fire, and performing agriculture, thus differentiating himself from other predators. For instance, the arrival of agriculture gave place to alterations in the existing ecosystems. However, it was in a very similar way to what happened in natural phenomena.

Although such changes in the environment surrounding man are very ancient, it was until the industrial revolution when man obtained enough control over the environment as to deteriorate it. Even though such deterioration is relatively recent with respect to human history, there had to pass almost two hundred years before solutions started to be sought. In view of this, the new challenge that civilization has to face nowadays consists of knowing how to make maximum the availability of necessary goods as the cost in terms of pollution, use of natural resources and other related issues is minimized.

Other of the most affected resources, mainly in big cities, is air, which is polluted with all kind of gases and floating particles. Against what could be thought, molecules of inorganic nature are the most common pollutants in atmosphere, except for partially burnt hydrocarbons and other substances coming regularly from combustion processes. For example, in the treatment of metallic sulfur minerals, the toasting processes can be an important pollution source if there is no effort to catch the sulfur dioxide that is discharged as byproduct.

A classical example of this problem is described in the article of C. R. Hursh in 1935 in the brochure: "Local Climate of Cooper Basin of Tenessee as Modified by Removal of Vegetation", USDA, number 774. There, it is described what happened in Copperhill, Tenn., where the products of metallic sulfur minerals toasting have altered the woods in an area of almost 220 $km^2$. The woods have disappeared almost completely, although some zones with grass in a girdle covering approximately 7000 hectares still exist, thus leaving a remaining area of 28000 hectares completely without vegetation.

Less known is the damage caused by a zinc foundry in Leigh gap, Pa. It is presented in the article of M. J. Jordan in 1975 in the magazine "Ecology", number 56, volume 78. The damage was caused by emissions of sulfur dioxide, zinc, cadmium, copper and lead. The samples of the ground, taken approximately two kilometers away from the foundry, contained more than 8% of zinc.

As it can be seen from the latter, air pollutants can also produce pollution of the ground and ecosystems due to the fact that they travel easily and rapidly. Air pollutants can be classified in different ways, considering both the emitting source and the physical and chemical features of the emissions.

It is quite difficult to characterize the pollution producing sources. There has been estimated that in the United States 60% of the air pollution comes from engine driven vehicles and 14% comes from electricity generating plants, as industry produces about 17%, the remaining 9% coming from air conditioning. The annual emission of pollutants in the United states is very meaningful since, as mentioned, engine driven vehicles contribute with about 60% of the total pollution, from which almost all is carbon monoxide, two thirds of hydrocarbons, one half of nitrogenous oxide and little fractions of other compounds.

The pollution due to combustion engine driven vehicles is a much bigger problem in big cities, and even more in the largest such as Mexico City. In big cities the extent of urban areas and the intense economic and social life forces people to travel great distances in order to perform their ordinary activities.

It is estimated that in Mexico City, vehicle emissions represent about 76% from the total pollutants emitted to the atmosphere; private vehicles emit more than half the pollutants of vehicular origin, and when using gasoline, they also produce lead oxides, sulfur and suspended particles.

Nevertheless, it is necessary to consider that pollutants come from fixed sources as well as from mobile sources. In developing countries it has been found that environmental pollution comes mainly from industries that throw their wastes illegally during the night, i.e., pollution comes from fixed sources.

On the other hand, in its simplest form, control of air pollution needs basic knowledge for establishing adequate criteria in order to maintain the freshness of air; ability to relate air quality to emission levels; establishment of emission limits or other control standards; means for measuring emissions and air quality and availability of practical techniques for reducing the emissions that pollute it.

In regard to the practical techniques for reducing emanations, even though it has been given attention to process changes that reduce polluting emissions, a great confidence has been given also to physical processes for eliminating such pollutants therefrom.

Within the existing techniques, a distinction is made between those developed for appliance on mobile sources directly and those developed to be used in fixed sources. It is worth mentioning that most of them have focussed on the treatment and control of emissions coming from fixed sources. This is probably due to the easiness of installation, operation and maintenance and to the pressure exerted by governments over industries, thus forcing them to install apparatus that enable them to comply with the increasingly strict rules in regard to the pollutants emitted to the atmosphere.

The apparatus used to clean the air from particles coming from fixed sources are based basically on aerodynamic catch, such as inertial impact, direct interception and diffusion. However, some apparatus use electrical and thermal forces, chemical reactions, and apply principles such as absorption, adsorption, condensation, etc.

Filtration is one of the most used methods, in which various types of filters are incorporated in direct interception processes as well as in diffusion processes, in a way that there can be achieved very high efficiencies not only with big particles but with the small ones. The use of these principles has resulted in the development of various technologies. For instance, Mexican Patent No. 131020 is related to an air purifying apparatus. It comprises at least one particle-filtering module in one of its walls and an activated carbon filter module, wherein the particle-filtering module comprises a filter for fine particles and one for bulky particles.

Another example is the portable air purifier of Mexican Patent Number 188350 which comprises one chamber with an air intake and an air outlet, as well as a filtration means provided inside the chamber between the air intake and the air outlet. They are assembled in such a way that when air crosses through the chamber, the particles are retained due to the filtration means.

Among the possible variations there can be found bag filters, which are capable of managing particles having diameters of less than 1 micron. However, they show the disadvantage of having a maximum operating temperature of 500° F. and generating pressure drops higher than 4 in H2O, although they can achieve efficiencies around 99% and need little space for its operation. An additional inconvenient of these filters is the great sensitivity of the bags to humidity, filtration rates and temperature.

Obviously, there can be used different types of filters to achieve a better separation of the pollutants, as described in Mexican Patent Application number 9101571. The method is based on a filtration system comprising pre-filters, absolute filters and activated carbon filters that purify and sterilize polluted air, which is forced to pass through the same by means of one or more fans; thus achieving a retention efficiency of the filters of about 95%.

There have been made some efforts in order to achieve better results in collection by electrically charging the particles to be eliminated. These filters operate with a collecting efficiency of about 99.9%. This can be seen in the electrostatic filter air purifier shown in Mexican Patent Application No. 9501387, which comprises an electrode and an electrostatic filter that enhance separation and collection on pollutant emissions.

Another widely used technique is damp collectors that separate particles and operate due to the contact between particles contained in a gas stream with a liquid. Damp collectors generally use water, in the form of little drops, which is put in contact with the pollutants of the gas stream; the separation is due to the collision between the particles suspended in the gas stream and the little drops of water. Among damp collectors there can be found mainly spray towers, which can achieve efficiencies around 80%. Examples of use of these techniques can be found in the Mexican Patent Applications Nos. 9603017, 9600105 and 9301564.

Electrostatic precipitation is the most important technique in particle separation. In general terms, the particles present in a gas stream are electrically charged by means of a high voltage discharge coming from an electrode and are collected in collecting plates having an inverse polarity. Electrostatic precipitators can achieve efficiencies of 99% at optimal conditions, but its performance is still low under non-favorable conditions. Electrostatic precipitators are capable of retaining particles having diameters of less than 1 micron, operating within a temperature range between 40 and 850° F. Electrostatic precipitators generally have pressure drops of less than 1 in $H_2O$ and operate with efficiencies close to 99%.

There can be considered as principal components of electrostatic precipitators the electrical discharge plate and the particle-collecting surface. Charging the particles with a high voltage, whether positively or negatively, produces the separation, and then let the charged particle to be attracted by the collecting surface, which has an opposite charge than the particle.

Within the existing electrostatic filtering apparatus are found those described in U.S. Pat. Nos. 3,967,939, 4,140, 498, 4,194,888, 4,202,674, 4,626,262, 4,675,029, 5,039,318, 5,050,377, 5,121,601, 5,147,423, 5,248,324, 5,302,190 Y 5,439,508, among others.

Under the same principle, there are known apparatus operated by means of changes in the resistance as a method for the retention and separation of particles, which is found in U.S. Pat. No. 4,779,207, as U.S. Pat. Nos. 5,039.313 and 5,704,955 make use of conventional filters for the retention of such pollutants. Another similar method is the electrodynamic separation as described in U.S. Pat. No. 3,973,932.

Is worth mentioning, however, that filters in general are only used for eliminating suspended particles and not for eliminating other kinds of pollutants, such as gaseous type pollutants, for example.

On the other hand, condensation and precipitation principles are also useful methods for the separation of polluting emissions. As an example of the latter it is possible to mention Mexican Patents Nos. 186045 and 188200. They refer to processes for eliminating emissions by condensing and precipitating that comprise collecting the moisture charged air stream containing the emissions, of oil in this case, to be separated; cooling the moisture charged air that contains the emissions, which is collected at a moist saturation temperature at which the moisture contained in the air is condensed so as to form a liquid in such a way that an aqueous condensed liquid stream is formed and an outlet air stream containing moisture saturated air and liquid droplets; eliminating from the air stream the liquid droplets of the emissions in order to form a second condensed liquid stream containing an important part of the oil emissions; and heating the outlet air stream at a temperature over its moist saturation temperature in order to eliminate the humidity from the air and obtain an outlet air stream that can be discharged to the atmosphere. However, in this method is required the pollutant to be easily condensed, otherwise it would be maintained as gas and could not be eliminated by this method.

In general terms, most of the current techniques for treating gaseous polluted effluents of high efficiency present the inconvenience of requiring a liquid for the treatment, which in turn has to be post-treated to avoid pollution of effluents and ground. Additionally, the use of liquids generates corrosion in the apparatus and can be very sensitive to changes in particle properties thus decreasing its efficiency; and in general, they can only be used for certain kinds of pollutants. On the other hand, the apparatus that need not an additional fluid present low efficiency.

Nowadays, there are some apparatus capable to manage various types of 35 polluting emissions, both coming from fixed sources and from mobile sources. This ability is determined by the arrangement of its components and by the use of several of theabove-described techniques together. For instance, Mexican Patent No 180969 refers to an apparatus for separating environment-polluting agents. It is characterized by comprising a series of consecutive chambers that separate and retain polluting particles; a first chamber for the air reception which is provided with horizontal grilles with its openings covered with pre-filters that are maintained humid by means of a system of water spraying tubes; a second chamber that directs air and avoids the generation of turbulence; a third chamber comprising a plurality of deposit trays previously bath in a solution that enables it to retain such solid particles, as well as a steel mesh covered with filtrating means in order to trap the solid particles that were not retained by the mentioned trays; and a fourth chamber receiving the clean air coming from the third chamber to discharge it outside as a siphon.

From the above it can be observed that is possible to use some apparatus in a combined form and which combination results in a decrease of various types of pollutants present in a gas stream. Therefore, it is possible to use in the same method filters, pre-filters, washing techniques, precipitation, reaction, etc.

In Mexican Patent Application No 9603012 the improvements made to the last described apparatus are referred to, which consist of including a plurality of electrodes that allow the molecular breaking of the pollutants, which leads to a more efficient operation of the apparatus. Such electrodes perform an electronic bombardment on the effluent; thus generating ionization due to said electronic bombardment. Due to this reason this technique is also known as ionization. Actually, ionization by itself is used in air purifying apparatus. However, the efficiency of these apparatus is rather low and they are barely used for industrial gaseous effluent treatment.

Now then, in regard to mobile sources such as the combustion gases of automobiles, the most used apparatus are those of the catalytic type, which in addition to be expensive due to the noble metal content, they tend to be easily poisoned, thus decreasing its efficiency in a great extent.

In the specific case of engine combustion gases, although it has been achieved a decrease in the quantity of nitrous oxides, hydrocarbons, sulfur compounds and other polluting gases, the acid pH of the water expelled from the vehicle gas escapes has not been decreased. It is known that such water has pH values of approximately 4, this value being a very acid one for water. As it is easy to suppose, this phenomenon does not favor the elimination of acid rain nor of its harmful effects on health.

Consequently, for long it has been sought to overcome the inconveniences of prior art techniques for eliminating pollutant from gaseous streams by means of a combined system for the elimination of pollutants from gaseous effluents that allows to eliminate suspended particles such as gas pollutants, mainly coming from a combustion, without needing additional fluids for the treatment, which in addition has a high efficiency of pollutants removal.

OBJECTIVES OF THE INVENTION

Having in mind the drawbacks of the prior art, it is an object of the present invention to provide a combined system for the elimination of pollutants from gaseous effluents of easy and economic construction but with high efficiency and reliability for retaining in a great extent diverse solid pollutant particles suspended in air.

Another object of the present invention is to provide a combined system for the elimination of pollutants from gaseous effluents able to operate satisfactorily at extreme environmental conditions without presenting any changes or considerable variations regarding its efficiency. An additional object of the present invention is to provide a combined system for the elimination of pollutants from gaseous effluents that by means of a rapid and easy operation allows the maintenance and/or interchange of its internal parts.

It is also another object of the present invention to provide a combined system for the elimination of pollutants from gaseous effluents resulting to be very flexible in its manufacturing from a great variety of materials and shapes according to specific requirements.

Likewise, it is another object of the present invention to provide a combined system for the elimination of pollutants from gaseous effluents that allows to reduce the organic compounds expelled to the atmosphere, specially lower hydrocarbon chains.

Another object of the present invention is to provide a combined system for the elimination of pollutants from gaseous effluents that makes disappear the visible polluting particles that can be found suspended in the atmosphere.

Additionally, it is an object of the present invention to provide a combined system for the elimination of pollutants from gaseous effluents that allows to diminish the temperature of the gases expelled to the atmosphere.

It is also an object of the present invention to provide a combined system for the elimination of pollutants from gaseous effluents that allows a decrease of acidity in pluvial water as well as in the condensed water of the gas outlets of combustion engines.

Another object of the present invention is to provide a combined system for the elimination of pollutants from gaseous effluents that allows a decrease in the physical annoyances of people, generated by the exposure to atmospheres having high pollutant concentration.

In addition, another object of the present invention is to provide a combined system for the elimination of pollutants from gaseous effluents that can be used in both mobile sources and fixed sources. Still another object of the present invention is to provide a combined system for the elimination of pollutants from gaseous effluents that can be used in modular form.

It is also another object of the present invention to provide a combined system for the elimination of pollutants from gaseous effluents with a high particle retention level, specially for those toxic particles suspended in the environment. Another object of the present invention is to provide a combined system for the elimination of pollutants from gaseous effluents that allows a reduction in the amount of pollutant precursors expelled to the atmosphere.

It is an additional object of the present invention to provide a combined system for the elimination of pollutants from gaseous effluents that requires very low energy consumption for its operation. An additional object of the present invention is to provide a combined system for the elimination of pollutants from gaseous effluents that do not require additional fluids for the treatment but still having a high efficiency in pollutants removal.

A further object of the present invention is to provide an apparatus incorporating the combined system for the elimination of pollutants from gaseous effluents mentioned above.

BRIEF DESCRIPTION OF THE DRAWINGS

The novel features that are considered characteristic of the present invention are set forth particularly in the appended claims. However, the invention, as well as other objects and advantages thereof, will be best understood in the following detailed description of an specific embodiment, when read in connection with the accompanying drawings, in which:

FIG. 4A is a side view of the heat diffusion and molecular destabilization module of the apparatus in FIG. 2.

FIG. 4B is a cross section view of the heat diffusion and molecular destabilization module of FIG. 4A.

FIG. 8A is a left side view of the gas expulsion module of the apparatus in 25 FIG. 2.

FIG. 8B is a front view of the gas expulsion module of the apparatus in FIG. 8A.

DETAILED DESCRIPTION OF THE INVENTION

It has been surprisingly found that by incorporating two physical principles in the purification techniques of electronic bombardment and electrostatic interaction, directed to produce changes in the molecules comprising a gas stream, there can be achieved a much higher retention and decomposition of pollutant particles and molecules suspended in such gas stream than those obtained by means of the known techniques of electronic bombardment and electrostatic precipitation.

The combined system for the elimination of pollutants from gas effluents of the present invention has the main function of changing the primary composition of a gas stream, giving its molecules physical features that allow their retention and/or transformation in a high degree, thus achieving a considerable pollutant reduction.

Figure 1:
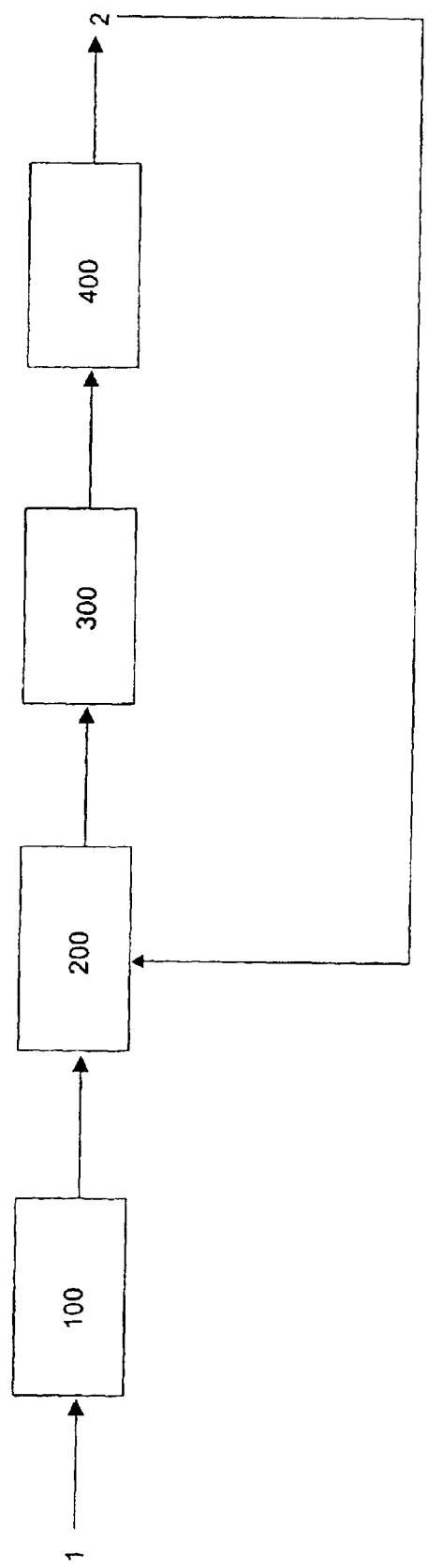
FIG. 1 is a block diagram of the combined system for the elimination of pollutants from gaseous effluents, built according to the principles of the present invention.

Having now more particular reference to the enclosed drawings, and more specifically to FIG. 1 thereof, it shows a block diagram of the combined system for the elimination of pollutants from gaseous effluents of the present invention. It comprises, in general, means for performing the following operations: heat diffusion and molecular destabilization 100; electronic bombardment 200; magnetic molecular rearrangement 300; and, electrostatic interaction 400.

The system functions by subjecting a polluted gas stream 1 to a molecular destabilization 100, where the gas flow is restricted in such a way that the gas molecules and the particles suspended thereof tend to separate and electronically destabilize, at the time the gas temperature is decreased. This operation 100 allows electronic bombardment operation 200 to increase its efficiency in a great extent, due to the fact that the bombarded electrons can affect the molecules more easily. Additionally, electronic bombardment 200 is performed under such voltages and current intensities that enough energy is provided to form chemical bonds, even ionic, between the gas molecules, thus forming compounds that by the combined effect of the decrease in temperature due to operation 100 and the increase in molecular weight can condense or precipitate. The latter happens in addition to the ionization generated inherently to the electronic bombardment in such molecules that do not achieve condensation.

Once electronic bombardment 200 is performed, a magnetic molecular rearrangement operation 300 is performed. It consists of subjecting the gases to a magnetic field having such force that allows a rearrangement of sub-particles and molecules of higher weight, and therefore, that allows a selective separation that separates the gas stream for electrostatic interaction operation 400. The electrostatic interaction 400 is improved due to the selective separation made by the magnetic molecular rearrangement 300. Once the electrostatic filtration is made, a treated gas stream 2 having low levels of pollutants is obtained.

As can be seen from FIG. 1, treated gases 2, can be subjected again to electronic bombardment 200, magnetic molecular rearrangement 300 and electrostatic filtration 400 operations as many times as wished, achieving with each repetition a higher decrease in the pollutants concentration, the only limitation being the economical convenience.

In a preferred embodiment of the system of the present invention, the heat diffusion and molecular destabilization operation is designed to decrease temperature in the polluted gas stream 1 to a range of about 30 to 50° C. and to generate a turbulent flow having a Reynolds number of about 10.12 to 1; the electronic bombardment 200 is designed to use direct current having a voltage within the range of 500 to 80000 Volts, approximately, and an approximate current intensity of 2 mA to 2A; and, the magnetic molecular rearrangement 300 is designed to generate a magnetic field of 0.5 to 3 militeslas. It is worth to further mention that it has been surprisingly found that by using such preferred current intensities and voltages, the achieved results are better than those achieved until now by means of prior art electronic bombardment systems.

By using the system of the present invention in gas streams coming from direct combustion of various materials, an elimination of 60% to 96%, approximately, of the present hydrocarbons and non-aromatic compounds is reached, and inclusively a decrease in the content of carbon dioxide of 25% is achieved. The system of the present invention does not produce ozone provided that an important amount of present molecular oxygen does not exist, i.e., when the gases getting into the system contain less than 15% of oxygen.

Likewise, the system of the present invention allows the elimination of those hydrocarbons that participate in the ozone formation reactions in the atmosphere, thus avoiding pollution by atmospheric ozone.

Figure 2:
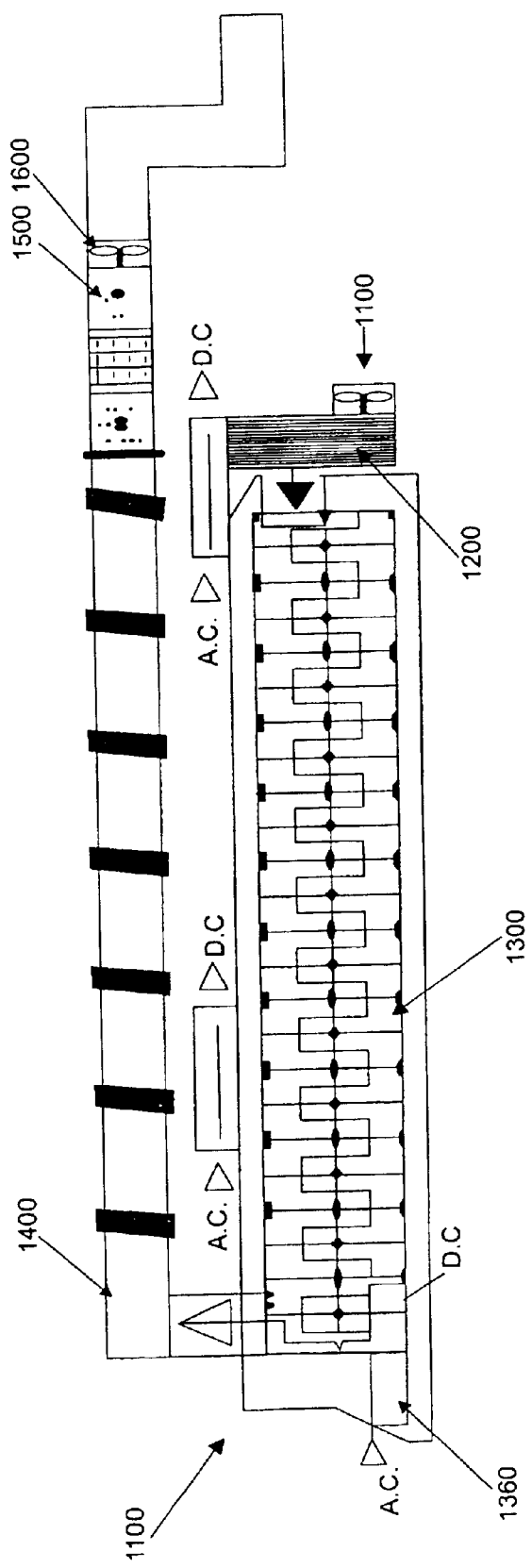
FIG. 2 is a top view of a preferred embodiment of an apparatus for the elimination of pollutants from gaseous effluents that works in accordance with the system of FIG. 1.

The system of the present invention can be used for manufacturing an apparatus for the elimination of pollutants from gaseous effluents 1000, which can be observed in FIG. 2. FIG. 2 shows a top plan view of apparatus 1000, wherein the following modules can be seen: A gas supply module 1100; heat diffusion and molecular destabilization module 1200; an electronic bombardment module 1300; a magnetic molecular rearrangement module 1400; an electrostatic interaction module 1500; and, a gas expulsion module 1600.

Figure 3B:
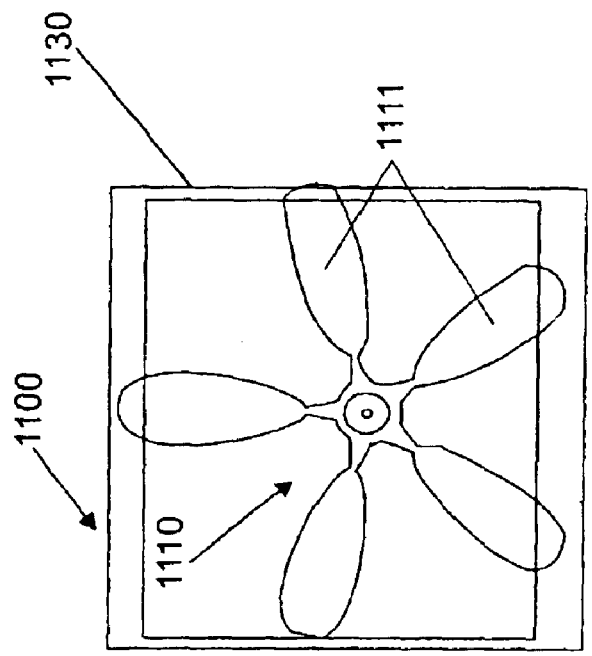
FIG. 3B is a front view of the gas supply module of the apparatus in FIG. 3A.
Figure 3A:
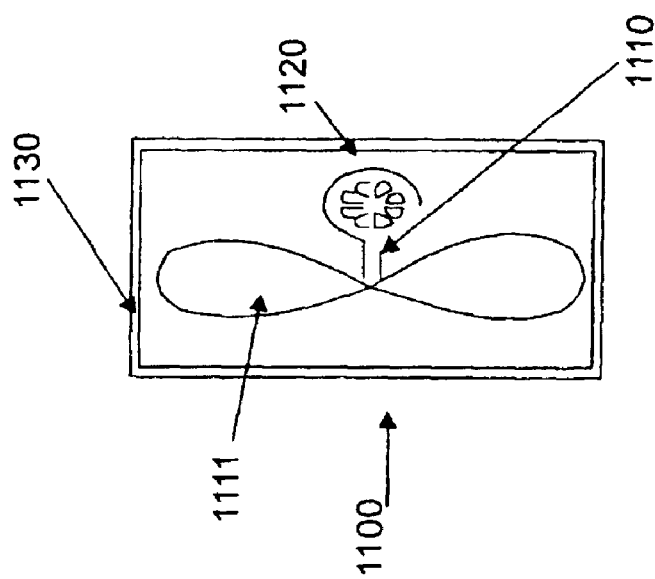
FIG. 3A is a left side view of the gas supply module of the apparatus in FIG. 2.

The gas supply module 1100 has the function of generating a positive pressure in order to let the gases that will be treated to flow there through. As can be seen in FIGS. 3A and 3B, in the described embodiment, the gas supply module 1100 is preferably a blower that includes an helix with a plurality of vanes 1111, which is coupled to motor means

1120, preferably an electric engine, that have the ability of introducing the gases into apparatus 1000, said blower being preferably contained inside a rectangular chamber 1130.

In an additional embodiment, the gas supply module includes control means to adjust the volumetric flow of gases to an adequate value for the treatment of thereof.

In regard to the heat diffusion and molecular destabilization module 1200, it has the function of decreasing the gas temperature and increasing its flow turbulence in order to generate a molecule destabilization. This is achieved, as can be seen on FIGS. 4A and 5B, by making the gases pass through a plurality of micro-tubes 1210 located inside a duct 1220. In the embodiment shown on FIGS. 4A and 4B, the duct 1220 includes 3 sections of micro-tubes, such micro-tubes preferably having an internal diameter of 0.5 to 5 mm, approximately. However, the dimensions of duct 1220 and micro-tubes 1210 are a function of the volumetric flow of the gases that are subjected to treatment, although it is preferred to change only the dimensions of duct 1220. In the described embodiment, duct 1220 has a circular cross section, as observed on FIG. 48, and also includes a 3-pass arrangement of the micro-tubes. In addition, the heat diffusion and molecular destabilization module 1200, includes first coupling means 1230 and second coupling means 1240, in order to allow the union of module 1200 with module 1100 and with module 1300.

Figure 5A:
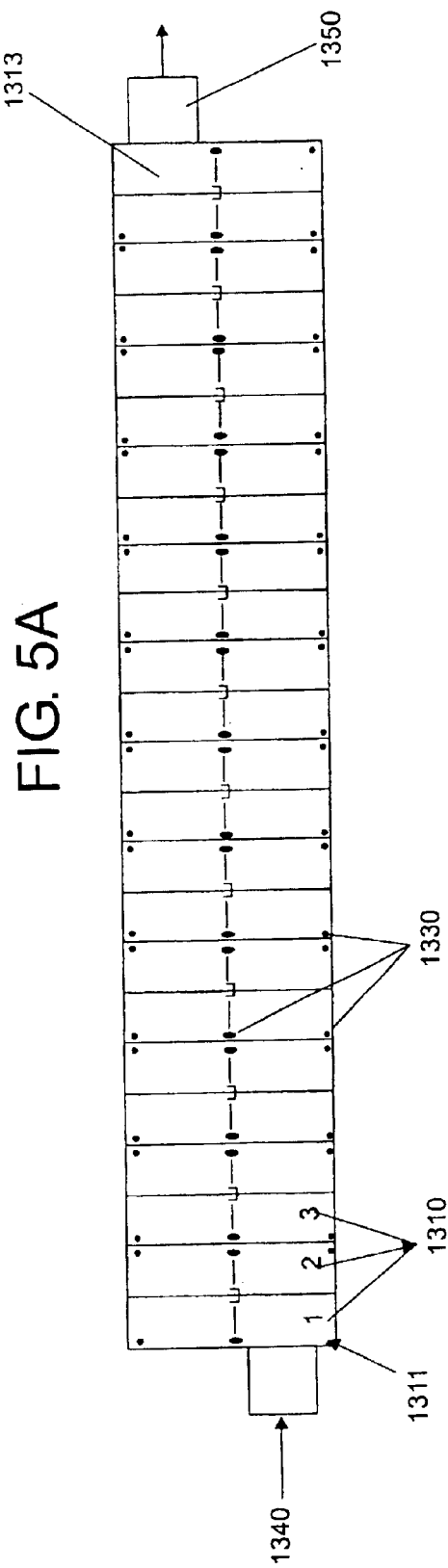
FIG. 5A is a side view of the electronic bombardment module of the apparatus in FIG. 2.
Figure 5B:
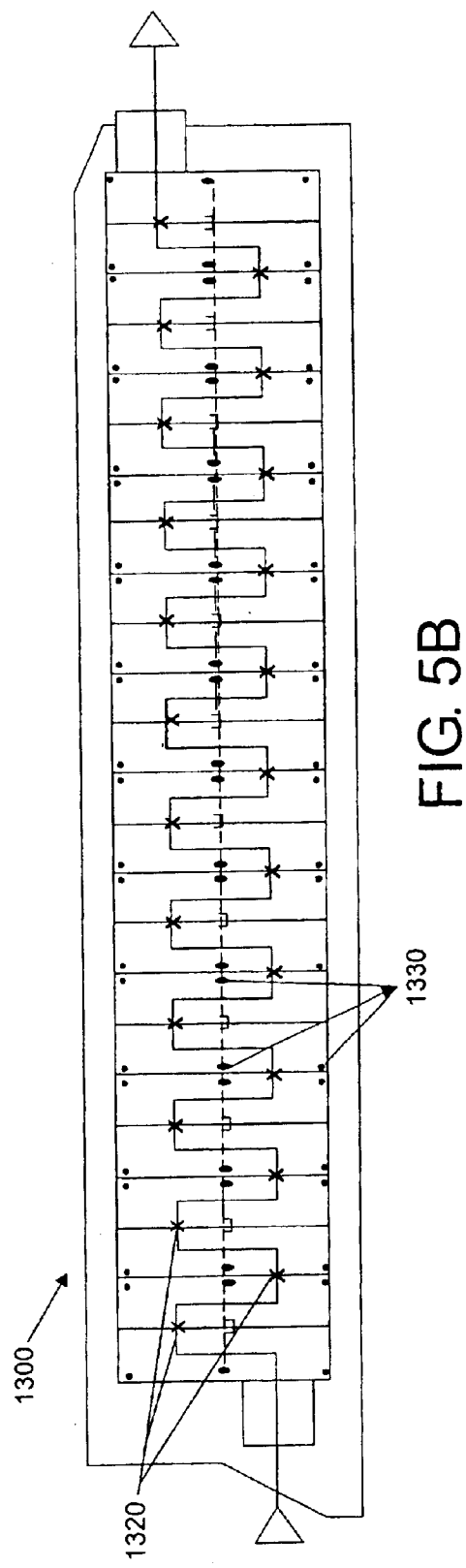
FIG. 5B is a top plan view of the electronic bombardment module of FIG. 5A.
Figure 5D:
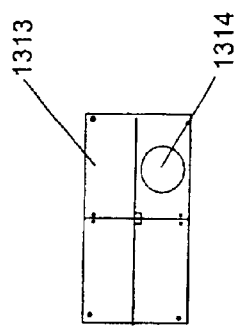
FIG. 5D is a back view of the electronic bombardment module of FIG. 5A.
Figure 5C:
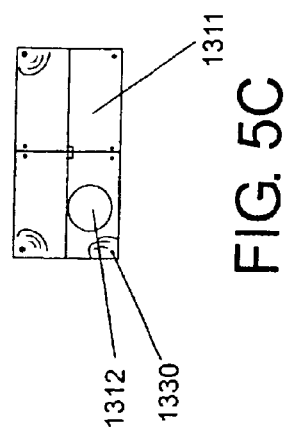
FIG. 5C is a front view of the electronic bombardment module of FIG. 5A.
Figure 5E:
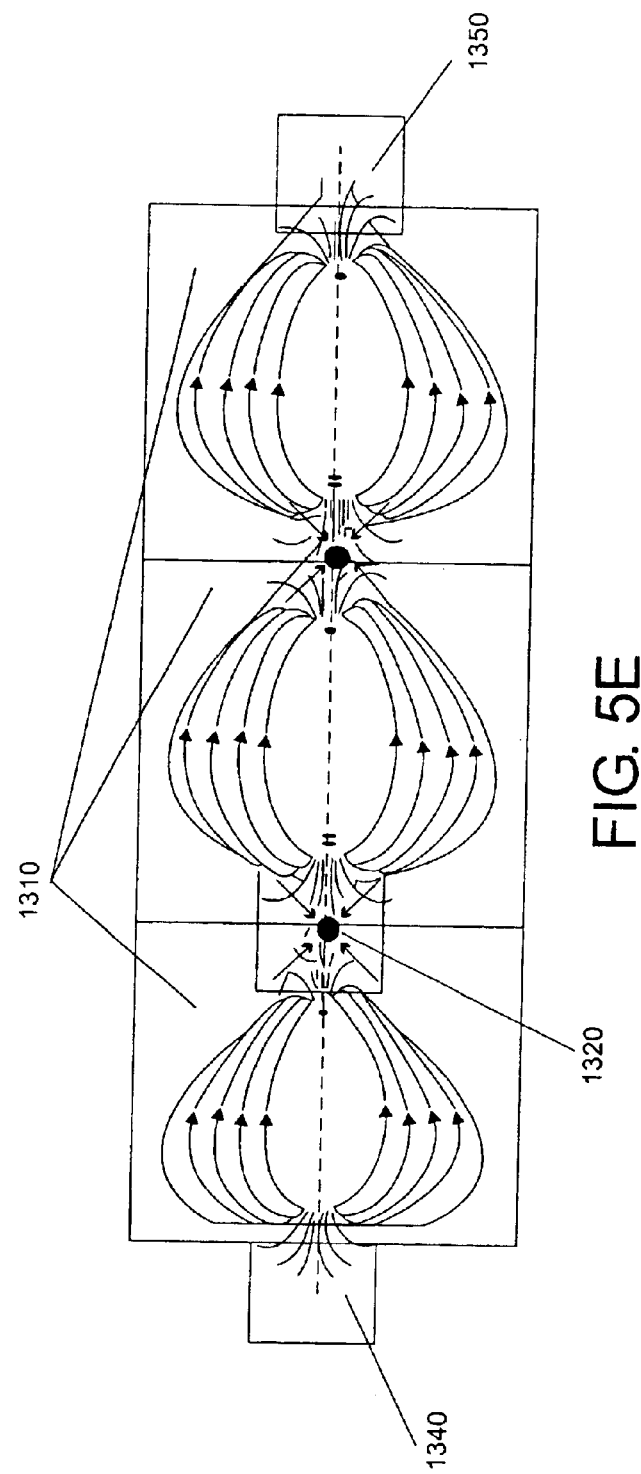
FIG. 5E is a schematic diagram of the Venturi principle used in the electronic bombardment module of FIG. 5A for generating turbulence.

On the other hand, as may be observed from FIGS. 5A and 5E, the electronic bombardment module 1300, in accordance with the described embodiment, is formed by a plurality of joined hermetic chambers 1310 serially connected by a plurality of flow restriction means 1320. Said restriction means, in addition, generate a better distribution of the gases in each chamber, direct the flow of gases so as to require the least space for the pass of gases through as most the chambers 1310 as possible. Such chambers have a dimension depending upon the volumetric flow of the gas stream and include at least a pair of elements for electronic bombardment 1330. The dimensions of the chambers are preferably such that provide a residence time of the gases in each chamber within the range of 0.3 to 10 seconds, approximately.

The electronic bombardment elements 1330, are electrically connected to a direct current source 1360 (shown in FIG. 2) that provide a voltage within the range of 50 to 80000 volts, approximately, and an approximated current intensity of 2 t to 2A. Preferably, an alternate current to direct current rectifier is used to provide the electrical energy needed for the performance of module 1300.

In a preferred embodiment of the present invention, electronic bombardment elements 1330 are produced by using materials preferably selected from copper, gold, nickel, tungsten, silver, wolframium, platinum, palladium, stainless steel, and combinations and/or alloys thereof.

Chamber 1311, which receives the gases coming from module 1200, includes a gas inlet orifice 1312 to the electronic bombardment module 1300, while the last chamber 1313 includes a gas outlet orifice 1314. Orifices 1312 and 1314 are respectively coupled to assembly means 1340 and 1350, to allow the interconnection of module 1300 with modules 1200 and 1400.

Is important to mention that flow restriction means 1320 allow the formation of a flow pattern as shown on FIG. 5E, i.e., Venturi type turbulence. In a preferred embodiment of the present invention the flow restriction means are selected among orifices and valves, preferably check valves.

Likewise, the collocation of chambers 1310 as well as of electronic bombardment elements 1330 is defined in such a way that voltaic arcs formation or circuit breakage is avoided, maintaining a geometry that allow the generation of an adequate electronic bombardment atmosphere.

In an additional embodiment, chambers 1310 include liquid drainage means by which the liquids that were condensed due to the electronic bombardment are eliminated.

Figure 6:
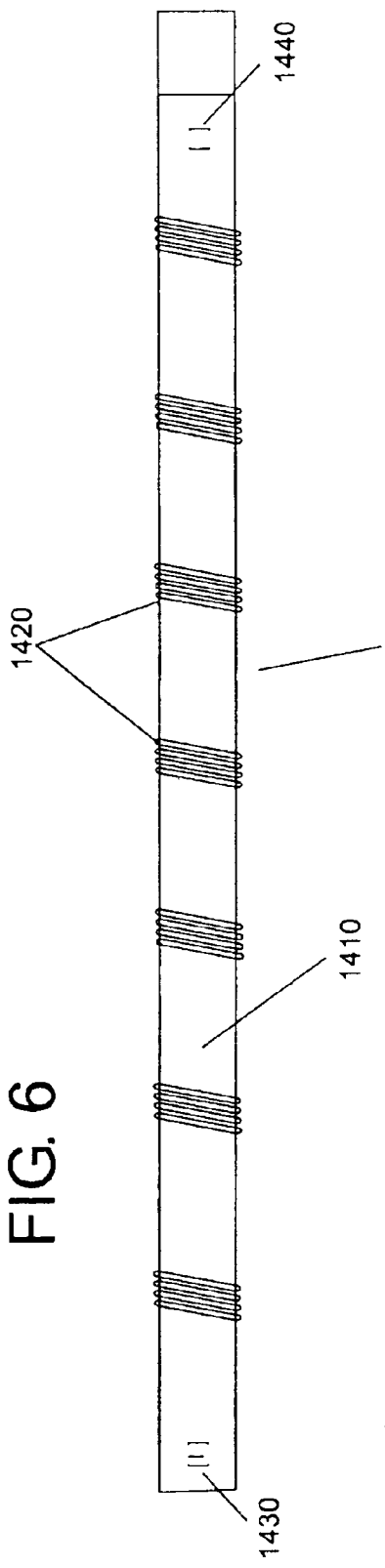
FIG. 6 is a side view of the magnetic molecular rearrangement module of 20 the apparatus in FIG. 2.

Referring now to FIG. 6, it shows the configuration for magnetic molecular rearrangement module 1400, which comprises a duct 1410 and magnetic field generating electromagnetic means. In the embodiment under description, a duct 1410 with circular transverse section including a plurality of coils 1420 so as to form a plurality of solenoid type electromagnetic arrangements by means of the unit duct-coils. The coils have a distance between themselves equivalent to the internal diameter of duct 1410. Electric energy is supplied to the described arrangement in such a way that a positive (south) magnetic pole 1430 is formed at the side of module 1400, which is connected to module 1300, while at the side connected to module 1500, a negative (north) magnetic pole 1440 is formed (see also FIG. 2).

Magnetic rearrangement module 1400 also includes an electric current source (not shown in the figures) that provides the electric current necessary to generate a magnetic field of 0.05 to 3 militeslas, thus achieving a rearrangement of sub-particles and heavier molecules, and therefore, a selective separation that prepares the gas stream for entrance to module 1500.

Figure 7A:
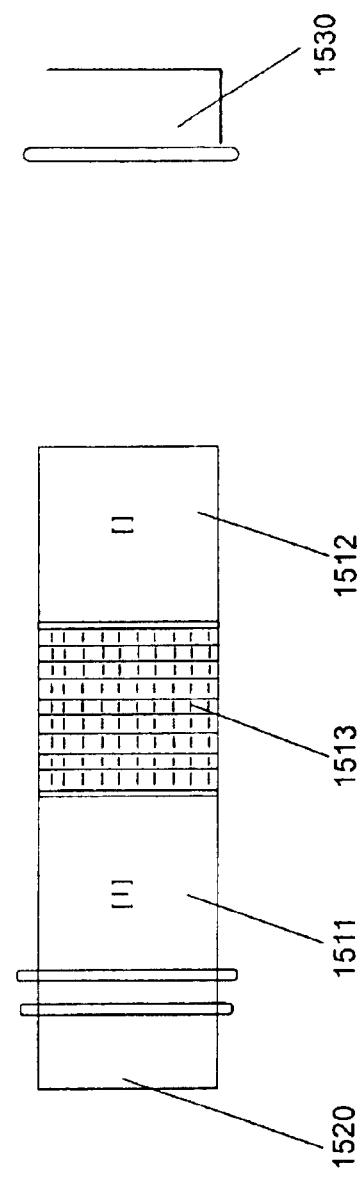
FIG. 7 A is a side view of the electrostatic interaction module of the apparatus in FIG. 2.
FIG. 7B is a front view of the electrostatic interaction module of FIG. 7A.
Figure 7B:
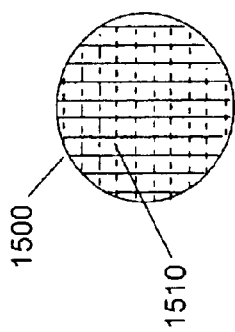

On the other hand the electrostatic interaction module 1500, shown in FIGS. 7A and 78 comprises, in general, an electrostatic filter 1510; first coupling means 1520 and second coupling means 1530. In the described embodiment, the electrostatic filter comprises a pair of filters 1511 and 1512 electrically charged by opposite charges, respectively. The filters have preferably a mesh of 5 to 50 microns, approximately, preferably 10, in the middle of which a mechanic filter 1513 is found, preferably with a mesh of 95% to 98.5% less than the used mesh to the pair of filters 1511 and 1512. The material used to produce the filters is any suitable of being electrically charged, preferably steel.

In the described embodiment, the first coupling means 1520 allow to connect module 1500 with module 1400, isolating both modules in order to avoid any electrical interference, while the second coupling means 1530 allow the union of module 1500 with module 1600. In an additional embodiment of the present invention, first and second coupling means 1520 and 1530 have a design that allows the easy release of the electrostatic filter. This is due to the fact that the electrostatic attraction generated by the positive and negative charges causes filters 1511 and 1512 to become saturated by the association of oppositely charged particles with the material thereof, thus making necessary its replacement.

Electrostatic interaction module 1500 also includes a current source (not shown on figures) that provides the electrical current needed to generate a positive charge of +5 to +50 kV, approximately, as well as a negative charge between −5 and −50 kV, approximately. Preferably, it generates a positive charge of approximately +25 KV and a negative charge of approximately −15 KV.

Finally, FIGS. 8A and 8B show gas expulsion module 1600, which has the 20 function of generating a negative pressure to induce the outlet of the treated gases towards the outside of the apparatus. In the described embodiment, gas expulsion module 1600 is preferably a blower including a fan 1610 with a plurality of vanes 1611 that is coupled to motor means 1620, preferably an electrical engine, having the ability of inducing the outlet of the gases from apparatus 1000. The blower is preferably within a rectangular chamber 1140.

In an additional embodiment, the gas supply module includes control means to adjust the volumetric flow of gases to an adequate value suitable for the treatment thereof.

In another additional embodiment, the treated gases coming out from the gas expulsion module 1600, are introduced again into an apparatus that does not include a heat dispersion and molecular destabilization module 1200, and therefore, module 1600 includes coupling means 1630.

The coupling means of the different modules are preferably selected from fastening and/or joining means. The preferred means are flanges, bearings, assemblies, screws, welding, threads, chamfers, rivets and/or combinations thereof.

Likewise, in a preferred embodiment of the present invention, each one of the electrical current sources of the modules of the apparatus includes a computer control and various electronic circuits and electronic protection in order to achieve a performance of the type considered as intrinsically safe. Likewise in an additional embodiment, the same energy source is shared to supply all the modules of the apparatus requiring the same.

Although an specific embodiment of the present invention, the advantages and applications of the same will be more clearly illustrated by means of the following examples, which are presented with illustrative but not limiting purposes.

EXAMPLES

For the execution of the examples, gases coming from various sources were treated in order to observe the effect that the combined system for the elimination of pollutants from gaseous effluents had over the generated gases, as well as the disadvantages of a combined system that does not incorporate the heat diffusion and molecular destabilization and the magnetic molecular rearrangement operations.

Following table 1 is presented, wherein the size of the peaks obtained in accordance with the results of a gas spectrophotometry, using a chromatographic column of the type PORAPAK-N@ 200C at the Nuclear Investigation National Institute (ININ), is shown. Chromatograms showing the presence of the various compounds before and after being treated by diverse methods were obtained. Likewise, the total amounts were determined by means of a column type AT-1000.

|  | EXAMPLE 1 | EXAMPLE 2 | EXAMPLE 3 | EXAMPLE 4 | EXAMPLE 5 |
|---|---|---|---|---|---|
| GASES ORIGIN | Toluene Degradation | Combustion of Gasoline Magna | Combustion of Gasoline Magna | Combustion of Hydrosoluble Oil | Combustion of Hydrosoluble Oil |
| SYSTEM EMPLOYED FOR THE TREATMENT OF GASES | Combined System of the present invention | Combined System of the present invention | Combined System of the present invention | Combined System of the present invention | System with electronic bombardment and electrostatic filtration only |
|  | REDUCTION | REDUCTION | REDUCTION | REDUCTION | REDUCTION |
| C1 | 98.15% | 80.00% | −6.25% | N.D. | N.D. |
| C2 | 99.62% | 79.00% | 73.53% | N.D. | N.D. |
| C3's | 99.45% | 99.83% | 88.64% | N.D. | N.D. |
| C4's | 96.55 | 90.91% | 65.85% | N.D. | N.D. |
| C5's | 97.06% | 98.86% | 82.09% | N.D. | N.D. |
| C6's | 11.32% | 92.42% | 89.06% | N.D. | N.D. |
| $CO_2$ | 21.43% | N.D. | N.D. | N.D. | N.D. |
| Others | N.D. | 75.00% | 60.00% | N.D. | N.D. |
| Total | N.D. | 91.43% | 91.36% | 91.50% | 66.5% |

Total = Percentage of diminishment of pollutants due to the treatment, as determined by means of column AT-1000.

Total=Percentage of diminishment of pollutants due to the treatment, as determined by means of column AT-1000.

As may be seen from table 1, by using the combined system of the present invention, it is possible to obtain the elimination of light hydrocarbons, as well as a decrease of pollutants in some cases of up to 91.50%.

Is important to stress the effect of the heat diffusion and molecular destabilization module, as well as of the magnetic molecular rearrangement module, which increase the pollutants removal, as shown in the results of examples 4 and 5. However, the preferred embodiment of the electronic bombardment barely achieves a reduction in 66.50% of pollutants. Nevertheless, it is evident to those skilled in the art that these results are better than those obtained up to the date by means of a prior art devices comprising electronic bombardment and electrostatic precipitation, due to the preferred voltages and current intensities used in example 5.

In accordance to the above description, it can be observed that both the combined system for the elimination of pollutants from gaseous effluents and the apparatus for the elimination of pollutants from gaseous effluents, have been designed for increasing in a great extent the efficiency of pollutants removal from gas effluents when using the electronic bombardment and electrostatic filtration techniques. It will be evident for those skilled in the art that the embodiments described herein before and illustrated in the enclosed drawings, are only illustrative but not restrictive of the present invention, since there are a lots of possible changes in its details without going beyond the scope of the invention.

Likewise, it is to be emphasized that there are possible many modifications to the invention as described and illustrated, such as different voltages, current intensities, or turbulence in the combined system for the elimination of pollutants from gaseous effluents, as well as of different construction materials, geometric shapes, energy sources and assembly embodiments for of each module that comprise the apparatus for the elimination of pollutants from gaseous effluents. The present invention, therefore, is not to be restricted except insofar as it is necessitated by the prior art and by the spirit of the appended claims.

What is claimed is:

1. A combined system for the elimination of pollutants from gaseous effluents comprising means for carrying out at least one electronic bombardment operation and means for carrying out at least one electrostatic interaction operation, characterized in that it includes means for carrying out a heat diffusion and molecular destabilization operation prior to performing the electronic bombardment operation, said heat diffusion and molecular destabilization operation consisting of restricting the flow of gases in such a way that it causes the gas molecules and the suspended particles thereof to tend to split up and electronically destabilize at the time the temperature of the same gases decreases; and, includes means for carrying out a magnetic molecular rearrangement prior to the electrostatic interaction operation, said magnetic molecular rearrangement operation consisting of subjecting the gases to a magnetic field having such a strength that it achieves a rearrangement of the sub-particles and heavier molecules, and therefore, a selective separation that prepares the gas stream for the electrostatic interaction operation.

2. A combined system for the elimination of pollutants from gaseous effluents, according to claim 1, further characterized in that the means for carrying out the electronic bombardment operation use such current intensities and voltages that they provide enough energy for the formation of chemical bonds, inclusively ionic, between the gaseous molecules, thus allowing the condensation or precipitation of compounds that are separated from the gaseous stream.

3. A combined system for the elimination of pollutants from gaseous effluents, according to claim 1, further characterized in that the means for carrying out the heat diffusion and molecular destabilization operation produce a temperature decrease in the gaseous effluent within an approximated range of 30 to 50° C. and generate a turbulent flow with a Reynolds number of approximately 10–12 to 1.

4. A combined system for the elimination of pollutants from gaseous effluents, according to claim 2, further characterized in that the means for carrying out the electronic bombardment operation use electrical direct current with voltage within the range of 500 to 80000 Volts, approximately, and an approximate current intensity of $2\,\mu A$ to 2A.

5. A combined system for the elimination of pollutants from gaseous effluents, according to claim 1, further characterized in that the means for carrying out the magnetic molecular rearrangement operation generate a magnetic field of 0.5 to 3 militeslas.

6. A combined system for the elimination of pollutants from gaseous effluents, according to claim 1, further characterized in that the system eliminates approximately between 60% and 96% of the present hydrocarbons and non-aromatic compounds.

7. A combined system for the elimination of pollutants from gaseous effluents, that comprising means for carrying out at least one electronic bombardment operation and means for carrying out at least one electrostatic interaction operation, characterized by including means for carrying out a heat diffusion and molecular destabilization operation prior to performing the electronic bombardment operation, said molecular destabilization operation consisting of a gas flow restriction in such a way that it causes the gas molecules and the particles suspended thereof to tend to split up and electronically destabilize at the time the temperature of the same gases decreases.

8. A combined system for the elimination of pollutants from gaseous effluents, according to claim 7, further characterized in that the means for carrying out the electronic bombardment operation use such current intensities and voltages that they provide enough energy for the formation of chemical bonds, inclusively ionic, between the gaseous molecules, thus allowing the condensation or precipitation of compounds that are separated from the gaseous stream.

9. A combined system for the elimination of pollutants from gaseous effluents, according to claim 7, further characterized in that the means for carrying out the heat diffusion and molecular destabilization operation causes a temperature decrease in the gaseous effluent within an approximate range of 30 to 50° C. and generate a turbulent flow with a Reynolds number of approximately 10–12 to 1.

10. A combined system for the elimination of pollutants from gaseous effluents, according to claim 8, further characterized in that the means for carrying out the electronic bombardment operation use electrical direct current with a voltage within the range of 500 to 80000 Volts, approximately, and an approximate current intensity of $2\,\mu A$ to 2A.

11. A combined system for the elimination of pollutants from gaseous effluents, comprising means for carrying out at least one electronic bombardment operation and means for carrying out at least one electrostatic interaction operation, characterized by including means for carrying out a magnetic molecular rearrangement prior to the means for carrying out each electrostatic interaction operation, said magnetic molecular rearrangement operation consisting of subjecting the gases to a magnetic field having a force such that a rearrangement of the sub-particles and heavier molecules is achieved, thus achieving a selective separation that prepares the gaseous stream for the electrostatic interaction operation.

12. A combined system for the elimination of pollutants from gaseous effluents, according to claim 11, further characterized in that the means for carrying out the electronic bombardment operation use such current intensities and voltages that they provide enough energy for the formation of chemical bonds, including ionic, between the gaseous molecules, thus allowing the condensation or precipitation of compounds that are separated from the gaseous stream.

13. A combined system for the elimination of pollutants from gaseous effluents, according to claim 12, further characterized in that the means for carrying out the electronic bombardment operation use electrical direct current with a voltage within the range of 500 to 80000 Volts, approximately, and an approximate current intensity of $2\,\mu A$ to 2A.

14. A combined system for the elimination of pollutants from gaseous effluents, according to claim 11, further characterized in that the means for carrying out the magnetic molecular rearrangement operation generate a magnetic field of 0.5 to 3 militeslas.

15. An apparatus for eliminating pollutants from gaseous effluents that comprising at least one electronic bombardment module and at least one electrostatic interaction module, characterized by including additionally a heat diffusion and molecular destabilization module through which gaseous effluent is passed in a first term; and, a magnetic molecular rearrangement module coupled to at least one electrostatic interaction module.

16. An apparatus for eliminating pollutants from gaseous effluents, according to claim 15, further characterized in that it includes a gas supplying module for generating a positive pressure.

17. An apparatus for eliminating pollutants from gaseous effluents, according to claim 16, further characterized in that the gas supplying module is a blower including an impeller having a plurality of vanes, which is coupled to motor means.

18. An apparatus for eliminating pollutants from gaseous effluents, according to claim 17, further characterized in that the motor means are an electric engine.

19. An apparatus for eliminating pollutants from gaseous effluents, according to claim 16, further characterized in that the gas supplying module includes control means for adjusting the volumetric flow of the gases to an adequate value for the treatment of the same.

20. An apparatus for eliminating pollutants from gaseous effluents, according to claim 15, further characterized in that the heat diffusion and molecular destabilization module comprises a plurality of micro-tubes that are inside a duct.

21. An apparatus for eliminating pollutants from gaseous effluents, according to claim 20, further characterized in that the duct includes 3 sections of micro-tubes.

22. An apparatus for eliminating pollutants from gaseous effluents, 10 according to claim 20, further characterized in that the micro-tubes have an internal diameter of 0.5 to 5 mm, approximately.

23. An apparatus for eliminating pollutants from gaseous effluents, according to claim 20, further characterized in that the duct has a circular transversal section.

24. An apparatus for eliminating pollutants from gaseous effluents, according to claim 20, further characterized in that the heat diffusion and molecular destabilization module includes first coupling means and second coupling means to allow the union of said module with the gas supplying module and with the electronic bombardment module.

25. An apparatus for eliminating pollutants from gaseous effluents, according to claim 15, further characterized in that the electronic bombardment module is formed by a plurality of hermetic adjoining chambers serially interconnected by means of a plurality of flow restriction means that generate a better distribution of the gases in each chamber, direct the gas flow in a way that the least space is required for the passage of the gases through many chambers as possible, such chambers having dimensions depending upon the volumetric flow of the gaseous stream and including at least a pair of electronic bombardment elements.

26. An apparatus for eliminating pollutants from gaseous effluents, according to claim 25, further characterized in that the dimensions of the chambers are such that allow a residence time of the gases in each chamber within the range of 0.3 to 10 seconds, approximately.

27. An apparatus for eliminating pollutants from gaseous effluents, according to claim 25, further characterized in that the electronic bombardment elements are found electrically connected to an electrical direct current source which provides a voltage within the range of 500 to 80000 Volts, approximately, and current intensity of approximately 2 $\mu$A to 2A.

28. An apparatus for eliminating pollutants from gaseous effluents, according to claim 25, further characterized in that an alternate current to direct current rectifier is used to-provide enough electrical energy for the performance of the electronic bombardment module.

29. An apparatus for eliminating pollutants from gaseous effluents, according to claim 25, further characterized in that the electronic bombardment elements are produced from materials selected preferably from copper, gold, nickel, tungsten, silver, wolframium, platinum, palladium, stainless steel, and combinations and/or alloys thereof.

30. An apparatus for eliminating pollutants from gaseous effluents, according to claim 25, further characterized in that the chamber that receives the gases coming from the heat diffusion and molecular destabilization module includes a gas inlet orifice to the electronic bombardment module, while the last chamber includes a gas outlet orifice, said orifices being respectively coupled to assembly means for allowing the interconnection of the electronic bombardment module with the heat diffusion and molecular destabilizing and magnetic molecular rearrangement modules.

31. An apparatus for eliminating pollutants from gaseous effluents, according to claim 25, further characterized in that the flow restriction means are selected from orifices and valves.

32. An apparatus for eliminating pollutants from gaseous effluents, according to claim 31, further characterized in that the flow restriction means are check valves.

33. An apparatus for eliminating pollutants from gaseous effluents, according to claim 25, further characterized in that the collocation of the chambers as well as of the electronic bombardment elements is defined in such a way that the formation of voltaic arcs or circuit breakdowns is avoided, maintaining a geometry that allows the generation of an adequate electronic bombardment atmosphere.

34. An apparatus for eliminating pollutants from gaseous effluents, according to claim 15, further characterized in that the magnetic molecular rearrangement module comprises a duct and magnetic field generating electromagnetic means.

35. An apparatus for eliminating pollutants from gaseous effluents, according to claim 34, further characterized in that the duct has a circular transversal section and includes a plurality of coils so as to form a plurality of solenoid electromagnetic arrangements by the unit duct-coils, said coils having a distance between them equivalent to the internal diameter of the duct.

36. An apparatus for eliminating pollutants from gaseous effluents, according to claim 35, further characterized in that the electrical energy supplied to the duct-coils arrangement is such that there is formed a positive (south) magnetic pole in the magnetic molecular module side that is interconnected to the electronic bombardment module, while in the side interconnected to the electrostatic interaction module, a negative (north) magnetic pole is formed.

37. An apparatus for eliminating pollutants from gaseous effluents, according to claim 34, further characterized in that the magnetic molecular rearrangement module further includes an electrical current source that provides the electrical current needed for generating a magnetic field of 0.5 to 3 militeslas.

38. An apparatus for eliminating pollutants from gaseous effluents, according to claim 15, further characterized in that the electrostatic interaction module comprises an electrostatic filter; first coupling means and second coupling means.

39. An apparatus for eliminating pollutants from gaseous effluents, 15 according to claim 38, further characterized in that the electrostatic filter comprises a pair of electrically charged filters with respectively opposite charges, between which a mechanical filter is found.

40. An apparatus for eliminating pollutants from gaseous effluents, according to claim 39, further characterized in that the pair of electrically charged filters have mesh sizes of approximately 5 to 50 microns.

41. An apparatus for eliminating pollutants from gaseous effluents, according to claim 40, further characterized in that the pair of electrically charged filters have mesh sizes of 10 microns.

42. An apparatus for eliminating pollutants from gaseous effluents, 25 according to claim 39, further characterized in that the mechanical filter has a mesh size of approximately 95% to 98% less than the mesh of the pair of filters.

43. An apparatus for eliminating pollutants from gaseous effluents, according to claim 39, further characterized in that the filters are made of steel.

44. An apparatus for eliminating pollutants from gaseous effluents, according to claim 38, further characterized in that the first coupling means allow the connection of the electrostatic interaction module with the magnetic molecular rearrangement module, isolating both to avoid any electrical interference, while the second coupling means allow the union of the electrostatic interaction module with a gas expulsion module.

45. An apparatus for eliminating pollutants from gaseous effluents, according to claim 44, further characterized in that the first and second coupling means have a design allowing an easy removal of the electrostatic filter.

46. An apparatus for eliminating pollutants from gaseous effluents, according to claim 38, further characterized in that the electrostatic interaction module further includes an electrical current source that provides the electrical current needed for generating a positive charge of +5 to +50 kV, approximately, as well as a negative charge of −5 to −50 kV, approximately.

47. An apparatus for eliminating pollutants from gaseous effluents, according to claim 46, further characterized in that the electrical current source provides the electrical current needed for generating a positive charge of approximately +25, as well as a negative charge of approximately −15 kV.

48. An apparatus for eliminating pollutants from gaseous effluents, according to claim 15, further characterized in that a gas expulsion module is a blower including an impeller having a plurality of vanes which is coupled to motor means, said blower being contained in a rectangular chamber.

49. An apparatus for eliminating pollutants from gaseous effluents, according to claim 48, further characterized in that the motor means are an electric engine.

50. An apparatus for eliminating pollutants from gaseous effluents, according to claim 48, further characterized in that the gas expulsion module includes control means for adjusting the volumetric flow of the gases to an adequate value for the treatment of the same.

51. An apparatus for eliminating pollutants from gaseous effluents, according to claim 15, further characterized in that the treated gases discharged from a gas expulsion module are again taken into an apparatus not including the heat dispersion and molecular destabilizing module, because of which the gas expulsion module includes coupling means.

52. An apparatus for eliminating pollutants from gaseous effluents, according to claim 19 further characterized in that each of the electrical current sources of the device modules includes computer control and various electric and electronic circuits for protection in order to achieve a performance considered as intrinsically safe.

53. An apparatus for eliminating pollutants from gaseous effluents, according to claim 27 further characterized in that the same electrical current source is used for supplying the electrical energy to the apparatus modules that require it.

* * * * *